(12) United States Patent
Rautschek et al.

(10) Patent No.: US 8,449,666 B2
(45) Date of Patent: May 28, 2013

(54) AQUEOUS DISPERSIONS OF ORGANOSILICON COMPOUNDS

(75) Inventors: Holger Rautschek, Nuenchritz (DE); Hartmut Ackermann, Burghausen (DE)

(73) Assignee: Wacker Chemie AG, Munich (DE)

( * ) Notice: Subject to any disclaimer, the term of this patent is extended or adjusted under 35 U.S.C. 154(b) by 787 days.

(21) Appl. No.: 12/276,436

(22) Filed: Nov. 24, 2008

(65) Prior Publication Data
US 2009/0139434 A1    Jun. 4, 2009

(30) Foreign Application Priority Data
Nov. 30, 2007    (DE) .......................... 10 2007 047 907

(51) Int. Cl.
*C09D 5/00*    (2006.01)
*C08L 83/06*    (2006.01)
*C08L 83/08*    (2006.01)

(52) U.S. Cl. .................. 106/287.13; 524/838; 524/837; 106/287.11; 106/287.16

(58) Field of Classification Search .......................... None
See application file for complete search history.

(56) References Cited

U.S. PATENT DOCUMENTS

| | | | |
|---|---|---|---|
| 3,048,499 A | | 8/1962 | Jellinek |
| 5,856,513 A | * | 1/1999 | Ue et al. .................... 548/347.1 |
| 5,882,387 A | * | 3/1999 | Martin et al. ...................... 106/3 |
| 6,294,608 B1 | * | 9/2001 | Hager et al. .................. 524/838 |

FOREIGN PATENT DOCUMENTS

| | | |
|---|---|---|
| DE | 1 069 057 | 11/1959 |
| EP | 0 234 024 A1 | 9/1987 |
| EP | 0 340 816 A2 | 11/1989 |
| EP | 0 631 999 A2 | 1/1995 |
| EP | 1 147 072 A1 | 6/2000 |
| JP | 62-043424 A | 2/1987 |
| JP | 09-208937 A | 8/1997 |
| WO | 95/16752 A1 | 6/1995 |
| WO | 95/22580 A1 | 8/1995 |
| WO | 97/47569 A1 | 12/1997 |
| WO | 00/34207 A1 | 5/2000 |
| WO | 0100309 A | 1/2001 |

OTHER PUBLICATIONS

Xiaowen Guo et al., "Calculation of hydrophile-lipophile balance for polyethoxylated surfactants by group contriction method", Journal of Colloid and Interface Science 298 (2006), pp. 441-450.
Stefan Schultz et al, "Hochdruckhomogenisation als ein Verfahren zur Emulsionsherstellung", describes High-Pressure Homogenization for Emulsion Formation, Chemie Ingenieur Technik (74) 712002, pp. 901-909.

* cited by examiner

*Primary Examiner* — Yun Qian
(74) *Attorney, Agent, or Firm* — Brooks Kushman P.C.

(57) ABSTRACT

Aqueous dispersions of organosilicon compounds contain:
(A) as at least one organosilicon compound,
(A1) silanes of the formula $$R_aR^2{}_bSi(OR^1)_{4-a-b} \qquad (I)$$

and/or the partial hydrolysis products thereof and/or
(A2) siloxanes containing units $$R^3{}_c(R^4O)_dSiO_{(4-c-d)/2} \qquad (II)$$

(B) at least one nonionic emulsifier having an HLB value greater than or equal to 12, optionally as a mixture with nonionic emulsifiers having an HLB value of less than 12,
(C) at least one cationic surfactant $$(C1)\ R^9{}_eR^6{}_{(4-e)}N^+X^- \qquad (III)$$

and/or
(C2)

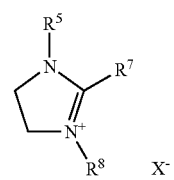

(IV)

(D) water.

The compositions are especially useful for the hydrophobing impregnation and mass hydrophobing of mineral and organic building materials.

8 Claims, No Drawings

AQUEOUS DISPERSIONS OF ORGANOSILICON COMPOUNDS

CROSS-REFERENCE TO RELATED APPLICATIONS

This application claims priority to German Application No. DE 10 2007 047 907.9 filed Nov. 30, 2007, which is hereby incorporated by reference.

BACKGROUND OF THE INVENTION

1. Field of the Invention

The invention relates to aqueous dispersions of organosilicon compounds, the preparation thereof and the use thereof, in particular for the hydrophobing impregnation and mass hydrophobing of mineral and organic building materials.

2. Background Art

Silanes and siloxanes have long been used for the production of structures, for example in the form of solutions of silanes in organic solvents, as described, for example, in DE-A 1069057. However, for cost reasons as well as health hazards and handling of organic solvents with the associated environmental pollution associated with them, such solvent-borne compositions are disadvantageous.

Aqueous formulations based on alkylalkoxysilanes and alkylalkoxysiloxanes are known. EP-A 234 024 describes silane emulsions comprising nonionic emulsifiers which have an HLB value of from 4 to 15. According to EP-A 340 816, the stability of these compositions is improved by the addition of buffer salts. EP-A 631 999 describes aqueous formulations based on alkylalkoxysilanes which contain cationic emulsifiers. According to WO-A 199516752 and EP-A 907 622, amine soaps are said to be suitable in particular for the preparation of silane/siloxane emulsions. WO-A 199522580 describes a series of further cationic emulsifiers in silane/siloxane emulsions. According to EP-A 1 147 072, the stability of silane/siloxane emulsions is particularly good when ionic emulsifiers are used in combination with nonionic emulsifiers which have an HLB value of less than 11.

Nevertheless, the aqueous compositions prepared according to the prior art do not always have the desired stability and efficiency.

SUMMARY OF THE INVENTION

It has now been surprisingly discovered that highly stable emulsions of alkylalkoxy-functional organosilicon compounds may be prepared using a combination of at least one non-ionic emulsifier having an HLB $\geq 12$, and at least one nitrogen-containing cationic emulsifier.

DETAILED DESCRIPTION OF THE PREFERRED EMBODIMENT(S)

The invention relates to aqueous dispersions containing:
(A) at least one organosilicon compound selected from
(A1) silanes of the formula $$R_a R^2{}_b Si(OR^1)_{4-a-b} \quad (I),$$

in which
R may be identical or different and are monovalent, SiC-bonded, optionally substituted hydrocarbon radicals having at least 4 carbon atoms,
$R^1$ may be identical or different and are monovalent, optionally substituted hydrocarbon radicals,
$R^2$ may be identical or different and are monovalent, SiC-bonded, optionally substituted hydrocarbon radicals having 1 to 3 carbon atoms,
a is 1, 2 or 3 and
b is 0, 1 or 2, with the proviso that the sum of a and b is 1, 2 or 3,
and/or the partial hydrolysis products thereof, and
(A2) siloxanes containing units of the formula $$R^3{}_c(R^4O)_d SiO_{(4-c-d)/2} \quad (II),$$

in which
$R^3$ may be identical or different and is a hydrogen atom or a monovalent, SiC-bonded, optionally substituted hydrocarbon radical,
$R^4$ may be identical or different and is a hydrogen atom or a monovalent, optionally substituted hydrocarbon radical,
c is 0, 1, 2 or 3 and
d is 0, 1, 2 or 3, with the proviso that
the sum of c and d is less than or equal to 3,
(B) at least one nonionic emulsifier having an HLB value greater than or equal to 12, preferably greater than or equal to 14, optionally as a mixture with nonionic emulsifiers having an HLB value of less than 12,
(C) at least one cationic surfactant selected from
(C1) compounds of the formula $$R^9{}_e R^6{}_{(4-e)} N^+ X^- \quad (III)$$

and
(C2) compounds of the formula

(IV)

in which
$R^5$ are optionally substituted hydrocarbon radicals,
$R^6$ may be identical or different and are optionally substituted aliphatic hydrocarbon radicals having at least 10 carbon atoms or optionally substituted aromatic hydrocarbon radicals having at least 6 carbon atoms,
$R^7$ are optionally substituted aliphatic hydrocarbon radicals having at least 10 carbon atoms or optionally substituted aromatic hydrocarbon radicals having at least 6 carbon atoms,
$R^8$ are optionally substituted hydrocarbon radicals,
$R^9$ may be identical or different and are optionally substituted hydrocarbon radicals,
e is 2 or 3 and
$X^-$ is a monovalent organic or inorganic anion,
(D) water
and optionally
(E) further components.

Examples of the radical R are the 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; aryl radicals, such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and the β-phenylethyl radicals. Examples of substituted radicals R are aminoethylaminopropyl, glycidyloxypropyl and methacroylpropyl radical.

Radicals R are preferably hydrocarbon radicals having at least 4 carbon atoms, more preferably hydrocarbon radicals having 6 to 18 carbon atoms, in particular hexyl and octyl radicals, most preferably the n-hexyl radical, the n-octyl radical, and isooctyl radicals such as the 2,2,4-trimethylpentyl radical.

Examples of the radical $R^1$ are the radicals stated below for $R^3$. Radicals $R^1$ are preferably optionally substituted alkyl radicals having 1 to 4 carbon atoms, more preferably the methyl, ethyl, n-butyl, 2-methoxyethyl and isopropyl radicals, in particular the ethyl radical.

Radicals $R^2$ are preferably alkyl radicals having 1 to 3 carbon atoms, such as methyl, ethyl, n-propyl and isopropyl radicals, most preferably the methyl radical.

The value of a is preferably 1, while the value of b is preferably 0 or 1.

Examples of silanes (A1) are isobutyltriethoxysilane, hexyltriethoxysilane, hexylmethyldiethoxysilane, n-octyltrimethoxysilane, n-octyltriethoxysilane, n-octyltributoxysilane, isooctyltriethoxysilane, n-decyltriethoxysilane, dodecylmethyldimethoxysilane, hexadecyltrimethoxysilane, octadecylmethyldimethoxysilane, octadecylmethyldiethoxysilane and octadecyltriethoxysilane and aminoethylaminopropyltriethoxysilane, glycidoxypropyltrimethoxysilane and methacroylpropyltriethoxysilane. Silane (A1) is preferably n-hexyltriethoxysilane, n-octyltriethoxysilane with isooctyltriethoxysilane, n-octyltriethoxysilane and isooctyltriethoxysilane being particularly preferred.

If (A1) are partial hydrolysis products, those having 2 to 10 Si atoms are preferred. Partial hydrolysis products form when some of the radicals $OR^1$ in the silanes of the formula (I) are eliminated by reaction with water or steam and OH groups bonded to silicon form as a result. These in turn can condense with elimination of water to give siloxane bonds, resulting in oligomers which may also contain OH groups in addition to groups $OR^1$. Partial hydrolysis products of silanes of the formula (I) may also be present as an impurity in the silane of the formula (I).

Examples of radicals $R^3$ are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radicals; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; and octadecyl radicals such as the n-octadecyl radical; cycloalkyl radicals such as the cyclopentyl, cyclohexyl and cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and the β-phenylethyl radicals. Examples of substituted radicals $R^3$ are the trifluoropropyl radical, the aminopropyl radical, the aminoethylaminopropyl radical, the glycidyloxypropyl radical and the mercaptopropyl radical.

$R^3$ are preferably hydrocarbon radicals optionally substituted by oxygen- and nitrogen-containing functional groups and having 1 to 18 carbon atoms, more preferably alkyl radicals having 1 to 18 carbon atoms or aromatic hydrocarbon radicals having 6 to 9 carbon atoms, most preferably methyl, n-hexyl, n-heptyl, n-octyl, isooctyl, n-dodecyl, phenyl and ethylphenyl radicals, in particular the methyl radical.

Examples of the radical $R^4$ are the radicals stated for $R^3$. Radicals $R^4$ are preferably hydrogen or optionally substituted alkyl radicals having 1 to 4 carbon atoms, more preferably hydrogen or the methyl, ethyl, n-butyl, isopropyl and 2-methoxyethyl radicals, in particular hydrogen or methyl or ethyl radicals.

In formula (II), c is preferably 1, 2 or 3, and the value of d is preferably 0 or 1.

Examples of radicals $R^5$ and $R^9$ are, in each case independently of one another, the examples stated for radical $R^3$.

Radicals $R^5$ are preferably alkyl radicals having 1 to 4 carbon atoms, most preferably the methyl radical.

Examples of hydrocarbon radicals $R^6$ and $R^7$ are, in each case independently of one another, decyl radicals such as the n-decyl radical; dodecyl radicals such as the n-dodecyl radical; hexadecyl radicals, heptadecyl radicals, octadecyl radicals such as the n-octadecyl radical; aryl radicals such as the phenyl, naphthyl, anthryl and phenanthryl radicals; alkaryl radicals such as o-, m- and p-tolyl radicals; xylyl radicals and ethylphenyl radicals; and aralkyl radicals such as the benzyl radical and the α- and the β-phenylethyl radicals.

Examples of substituted hydrocarbon radicals $R^6$ and $R^7$ are, in each case independently of one another, lauramidoethyl radicals, palmitamidoethyl radicals and stearamidoethyl radicals. Radicals $R^6$ are preferably linear alkyl radicals having 12 to 22 carbon atoms or aromatic radicals, more preferably aromatic hydrocarbon radicals, in particular the benzyl radical, radicals $R^7$ are preferably linear alkyl radicals having 12 to 22 carbon atoms, in particular the lauryl, palmityl, oleyl and stearyl radicals.

Examples of radicals $R^8$ are the examples stated for radicals $R^5$, $R^6$ and $R^7$. Radicals $R^8$ are preferably optionally substituted alkyl radicals having 1 to 22 carbon atoms, more preferably the methyl, lauryl, palmityl, oleyl, stearyl, lauramidoethyl, palmitamidoethyl and stearamidoethyl radicals.

Radicals $R^9$ are preferably alkyl radicals having 1 to 4 carbon atoms, most preferably the methyl radical.

Examples of anion $X^{31}$ are halide ions such as the chloride, bromide and iodide ions, hydrogensulfate ions, alkylsulfate ions such as the methylsulfate ion, and dialkylphosphate ions. An anion $X^-$ is preferably a chloride, bromide, iodide or methylsulfate anion, most preferably a chloride or methylsulfate anion.

Siloxanes (A2) used according to the invention are any desired silicone oils, silicone resins, or oligomeric siloxanes which contain units of the formula (II). The siloxanes (A2) used according to the invention preferably contain no further units apart from the units of the formula (II).

Examples of (A2) are organopolysiloxanes such as organopolysiloxanes which contain alkoxy groups and can be prepared by reacting methyltrichlorosilane and optionally other alkyltrichlorosilanes or phenyltrichlorosilane with ethanol in water and correspond to empirical formulae such as $CH_3Si(OCH_2CH_3)_{0.8}O_{1.1}$ or $C_6H_5Si(OCH_2CH_3)_{0.7}O_{1.2}$; these oligomeric siloxanes have a viscosity of less than 500 mPa·s, preferably less than 100 mPa·s, and in particular less than 50 mPa·s, at 25° C.; and oligomeric siloxanes which are obtainable by hydrolysis/condensation from methyltriethoxysilane and isooctyltriethoxysilane and correspond, for example, to the formula $([MeSiO_{3/2}]_{0.3-0.5}[IOSiO_{3/2}]_{0.02-0.2}$ $[EtO_{1/2}]_{0.3-0.6})_x$ (Me is methyl, IO is isooctyl and Et is ethyl) and have a weight average molar mass of 1000-10,000 g/mol; silicone resins in which c is 1 in at least 70% of the units of the formula (II) and c is 2 in the other units of the formula (II), preferably silicone resins in which c is 1 in at least 80% of the units of the formula (II), in particular 90% of the units of the formula (II), these resins having a viscosity of more than 1000 mPa·s, preferably more than 5000 mPa·s, and in particular more than 10,000 mPa·s, at 25° C. and a content of from 1 to 6% by weight of alkoxy groups and from 0.2 to 1% by weight of hydroxyl groups; and polydimethylsiloxanes having a viscosity of from 30 to 1,000,000 mPa·s at 25° C., which may contain hydroxyl groups and/or aminoalkyl groups.

These siloxanes (A2) are preferably silicone resins, with mixtures of highly viscous silicone resins with low-viscosity oligomers or silicone oils being particularly preferred. These mixtures preferably have a viscosity of preferably from 100 to 100,000 mPa·s, in particular from 1000 to 10,000 mPa·s, at 25° C.

Component (A) is preferably (A1) or a mixture of (A1) and (A2), most preferably (A1) alone. If component (A) is a mixture of (A1) and (A2), the proportion of (A1) in the mixture is preferably from 20 to 96% by weight, in particular from 50 to 80% by weight, based in each case on the sum of (A1) and (A2).

The dispersions according to the invention preferably contain component (A) in amounts of from 5 to 70% by weight, more preferably from 30 to 65% by weight, based in each case on the total formulation.

Examples of the nonionic emulsifiers (B) are sorbitan fatty acid esters, ethoxylated sorbitan fatty acid esters, ethoxylated fatty acids, ethoxylated linear or branched alcohols having 10 to 20 carbon atoms, ethoxylated alkylphenols, pentaerythritol fatty acid esters, glyceryl esters and alkylpolyglycosides. The nonionic emulsifiers (B) are preferably sorbitan fatty acid esters, ethoxylated sorbitan fatty acid esters, ethoxylated fatty acids, ethoxylated linear or branched alcohols having 10 to 20 carbon atoms and ethoxylated triglycerides.

Preferably, the dispersions according to the invention contain no ethoxylated alkylphenols since it is known that these are not environmentally compatible.

The component (B) used according to the invention may be only one nonionic emulsifier having an HLB value of greater than or equal to 12, more greater than or equal to 14, or a mixture of a plurality of nonionic emulsifiers, with the proviso that at least one emulsifier has an HLB value greater than or equal to 12, in particular greater than or equal to 14.

Mixtures of nonionic emulsifiers, of which at least one emulsifier has an HLB value greater than or equal to 12, are preferably used as component (B). The proportion of emulsifiers having an HLB value greater than or equal to 12 in the emulsifier mixture (B) is preferably at least 30% by weight based on the emulsifier weight.

The HLB value is an expression of the balance between hydrophilic and hydrophobic groups of an emulsifier. The definition of the HLB value and methods for determining it are generally known and are described, for example, in JOURNAL OF COLLOID AND INTERFACE SCIENCE 298 (2006) 441-450 and the literature cited there.

Examples of the nonionic emulsifiers (B) having an HLB value greater than or equal to 12 are (HLB values according to manufacturer, POE is polyoxyethylene):

| Chemical Designation | HLB Value | Manufacturer (Example) | Tradename |
|---|---|---|---|
| POE (20) sorbitan monostearate | 14.9 | Croda[1] | Tween ® 60 |
| POE (20) sorbitan monooleate | 15.0 | Croda[1] | Tween ® 80 |
| PEO (20) sorbitan monolaurate | 16.7 | Croda[1] | Tween ® 20 |
| POE (200) castor oil | 18.1 | Croda[1] | Atlas ® G1300 |
| POE (40) stearate | 16.9 | Croda[1] | Myrj ® 52 |
| POE (23) lauryl ether | 16.9 | Croda[1] | Brij ® 35 |
| POE (10) isotridecyl ether | 13.7 | Sasol[2] | Marlipal ® 013/100 |
| POE (12) isotridecyl ether | 14.5 | Sasol[2] | Marlipal ® 013/120 |
| POE (16) isotridecyl ether | 15.6 | Cognis[3] | Arlypon ® IT 16 |

[1] Croda International Plc, Cowick Hall, Snaith Goole East Yorkshire UK
[2] Sasol Germany GmbH, Marl
[3] Cognis GmbH, Illertissen.

Examples of nonionic emulsifiers which can additionally be used and have an HLB value <12 are (HLB values according to manufacturer or Table 3 in the abovementioned source, POE is polyoxyethylene):

| Chemical Designation | HLB Value | Manufacturer (Example) | Tradename |
|---|---|---|---|
| Sorbitan monostearate | 4.7 | Croda[1] | Span ® 60 |
| Sorbitan monooleate | 4.3 | Croda[1] | Span ® 80 |
| Sorbitan monolaurate | 8.6 | Croda[1] | Span ® 20 |
| POE (4) lauryl ether | 9.7 | Croda[1] | Brij ® 30 |
| POE (6) isotridecyl ether | 11.4 | Sasol[2] | Marlipal ® 013/60 |
| POE (5) isotridecyl ether | 10.5 | Cognis[3] | Arlypon ® IT 5 |
| POE (4) stearyl ether | 7.5 | Cognis[3] | Arlypon ® SA 4 |

[1] Croda International Plc, Cowick Hall, Snaith Goole East Yorkshire UK
[2] Sasol Germany GmbH, Marl
[3] Cognis GmbH, Illertissen.

The dispersions according to the invention preferably contain component (B) in amounts of from 1.0 to 10% by weight, more preferably from 1.5 to 3% by weight, based in each case on the total formulation.

Examples of the component (C1) are all known quaternary ammonium compounds which carry at least one substituted or unsubstituted hydrocarbon radical having at least 10 carbon atoms, such as dodecyldimethylammonium chloride, tetradecyltrimethylammonium bromide, stearyltrimethylammonium chloride, distearyldimethylammonium chloride, cetyltrimethylammonium chloride, behenyltrimethylammonium bromide, dodecylbenzyldimethylammonium chloride and benzyltrimethylammonium chloride.

Components (C1) are preferably aryl- or alkyltrimethylammonium salts, such as stearyltrimethylammonium chloride and cetyltrimethylammonium chloride, particularly preferably benzyltrialkylammonium salts, in particular trimethylbenzylammonium chloride and trimethylbenzylammonium methosulfate.

Examples of the component (C2) used according to the invention are all known quaternary imidazolinium compounds which carry at least one substituted or unsubstituted hydrocarbon radical having at least 10 carbon atoms, such as 1-methyl-2-stearyl-3-stearylamidoethylimidazolinium methosulfate, 1-methyl-2-norstearyl-3-stearylamidoethylimidazolinium methosulfate, 1-methyl-2-oleyl-3-oleylamidoethylimidazolinium methosulfate, 1-methyl-2-stearyl-3-methylimidazolinium methosulfate, 1-methyl-2-behenyl- 3-methylimidazolinium methosulfate and 1-methyl-2-dodecyl-3-methylimidazolinium methosulfate.

Component (C2) is preferably 1-methyl-2-stearyl-3-stearyl-amidoethylimidazolinium methosulfate, 1-methyl-2-norstearyl-3-stearyl-amidoethylimidazolinium methosulfate, or 1-methyl-2-oleyl-3-oleylamido-ethylimidazolinium methosulfate.

Components (C) used according to the invention are preferably benzyltrimethylammonium compounds or quaternary imidazolinium compounds, quaternary imidazolinium compounds being particularly preferred.

The dispersions according to the invention preferably contain component (C) in amounts of from 0.1 to 5% by weight, more preferably from 0.3 to 1.5% by weight, based in each case on the total amount of the dispersion.

In dispersions according to the invention, the weight ratio of component (B) to component (C) is preferably from 0.5 to 10, in particular from 2 to 5.

Water (D) used in the invention may be any desired type of water, for example, natural waters such as rainwater, groundwater, spring water, river water and seawater; chemical waters such as demineralized water or distilled or (multiply) redistilled water; waters for medicinal or pharmaceutical purposes such as purified water (Aqua purificata; Pharm. Eur. 3), Aqua deionisata, Aqua destillata, Aqua bidestillata, Aqua ad injectionam or Aqua conservata, drinking water according to the German drinking water regulations, or mineral waters. Water (D) is preferably water having a conductivity of less than 10 µS/cm, in particular less than 2 µS/cm. The dispersions of the invention preferably contain component (D) in amounts of from 20 to 95% by weight, more preferably from 40 to 60% by weight, based in each case on the total amount of dispersion.

The further components (E) which are optionally used may be all additives which are useful in aqueous dispersions, for example, thickeners, organosilicon compounds which differ from (A1) and (A2), catalysts, substances for adjusting pH, buffers, fillers, fragrances, dyes, antifreezes such as glycols and glycol ethers, and preservatives. Examples of optionally used thickeners (E) are polyacrylic acid, polyacrylates, cellulose ethers such as carboxymethylcellulose and hydroxyethylcellulose, natural gums such as xanthan gum, and polyurethanes.

Examples of optionally used organosilicon compounds (E) are silanes which contain no hydrocarbon groups having at least 4 carbon atoms, for example tetraethoxysilane, trimethylmethoxysilane, aminopropyltriethoxysilane and aminopropylmethyldimethoxysilane.

Examples of substances for adjusting pH are, in addition to aminosilanes, also amines such as monoethanolamine, or alkali metal hydroxides. If required for ensuring a constant pH over a relatively long period, buffer systems, such as salts of acetic acid, salts of phosphoric acid, salts of citric acid, in each case in combination with the free acid, may also be used, depending on the desired pH.

The dispersions of the invention may contain silicon dioxide (silicic acids), titanium dioxide or aluminum oxide, preferably having a BET surface area of, from 20 to 1000 $m^2/g$, preferably a particle size of less than 10 µm and an preferably an agglomerate size of less than 100 µm as fillers (E). The optional fillers (E) are most preferably silicic acids, in particular those having a BET surface area of from 50 to 800 $m^2/g$. These silicic acids may be pyrogenic or precipitated silicic acids. In particular, pretreated silicic acids, such as, for example, commercially available completely or partly hydrophobed silicic acids, can be used as fillers (E). Examples of commercially available hydrophobic silicic acids which can be used according to the invention are pyrogenic, treated silicic acid having a BET surface area of 120 $m^2/g$ and a carbon content of 0.8% by weight (available under the name HDK® H15 from Wacker Chemie AG, Germany), a pyrogenic treated silicic acid having a BET surface area of 140 $m^2/g$ and a carbon content of 2.8% by weight (available under the name HDK® H2000 from Wacker Chemie AG, Germany) and a precipitated silicic acid treated with polydimethylsiloxane and having a BET surface area of 90 $m^2/g$ (available under the name "Sipernat D10" from Degussa AG, Germany).

The dispersions according to the invention are preferably free of water-immiscible solvents or contain water-immiscible solvents in amounts of not more than 1% by weight, based on the total amount of dispersion. In the context of the present invention, "water-immiscible solvents" are to be understood as meaning all solvents which are soluble in amounts of not more than 1 g/l in water at 20° C. and a pressure of 101.325 kPa. In particular, these water-immiscible solvents have a vapor pressure of 0.1 kPa or higher at 20° C. Examples of such water-immiscible solvents are benzene, toluene, xylene, hexane, cyclohexane and paraffinic hydrocarbon mixtures.

The dispersions according to the invention are preferably those containing:
(A) organosilicon compound (A1), optionally as a mixture with (A2),
(B) mixtures of nonionic emulsifiers, of which at least one emulsifier has an HLB value greater than or equal to 12,
(C) cationic surfactant of the formulae (III) and/or (IV),
(D) water and
optionally
(E) further components.

The dispersions according to the invention are more preferably those containing:
(A) from 10 to 60% by weight of (A1) and from 0 to 20% by weight of (A2),
(B) from 1.0 to 10% by weight of mixtures of nonionic emulsifiers, of which at least one emulsifier has an HLB value greater than or equal to 12,
(C) from 0. 1 to 5% by weight of cationic surfactants of the formulae (III) and/or (IV),
(D) water and
optionally
(E) further components different from the above.

In particular, the dispersions according to the invention contain no further components over and above the components (A), (B), (C), (D) and (E).

The preparation of the aqueous dispersions according to the invention is effected by processes known per se. Usually, the preparation is effected by simple stirring of all constituents at temperatures of preferably from 1 to 50° C. and optionally subsequent homogenization, for example using jet dispersers, rotor-stator homogenizers at peripheral speeds of preferably from 5 to 40 m/s, colloid mills or high-pressure homogenizers, preferably at homogenization pressures of from 50 to 2000 bar. The invention furthermore relates to a process for the preparation of the dispersions according to the invention by mixing the components (A), (B), (C), (D) and optionally (E).

In a preferred embodiment of the process according to the invention, the component (B), at part of the component (D) and optionally component (C) are initially introduced, the component (A) is incorporated using a rotor-stator homogenizer, the remaining amount of component (D), optionally component (E) and, unless also already initially introduced at the beginning, component (C) are incorporated with homogenization. This is preferably followed by homogenization using a high-pressure homogenizer at from 50 to 2000 bar, in particular at from 100 to 500 bar. Homogenization techniques, including high-pressure homogenizers, are generally known. In this context, reference may be made, for example, to Chemie Ingenieur Technik, 74(7), 901-909 2002.

In the process according to the invention, it is possible—if desired—to use the components (A1) and/or (A2) and optionally (E) in the form of dispersions or solutions and to mix them with the remaining components.

The dispersions according to the invention are preferably milky, white to beige liquids, preferably have a pH of from 5 to 9, in particular from 6 to 8, and preferably have a proportion of nonvolatile compounds (for example determined according to ASTM D 5095) of from 10 to 80% by weight, more preferably from 20 to 70% by weight. The dispersions preferably have a volume-average particle size from 0.1 to 10 µm, in particular from 0.3 to 1.5 µm.

The dispersity of the dispersions according to the invention is preferably in the range of from 0.5 to 5, more preferably from 1.5 to 3. This value is calculated from $(D_{90}-D_{10})/D_{50}$, where $D_x$ is the particle size at which x % of the volume of the internal phase are present in particles of less than or equal to this particle size.

The dispersions preferably have a viscosity of less than 10,000 mPa·s, in particular less than 1000 mPa·s, measured in each case at 25° C. The dispersions have the advantage(s) that they have a very long shelf-life, can be prepared economically, and are simple to handle. The dispersions have the further advantage(s) that they can be easily diluted and have a very long shelf-life even in dilute form, that the process for the preparation of the dispersions can be carried out in a simple manner, and that the dispersions develop a very good and stable impregnating effect and very good penetration behavior on different substrates.

The aqueous dispersions according to the invention can be used for all purposes for which dispersions based on organosilicon compounds are useful. They are, for example, outstandingly suitable as preservatives for structures, in particular for hydrophobing various mineral or organic substrates. The manner in which such dispersions are used is known to the person skilled in the art.

The present invention furthermore relates to a process for the treatment of substrates, wherein the substrates are brought into contact with the dispersions according to the invention. Examples of substrates which can be treated with the dispersions include mineral substances such as masonry, mortar, brick, limestone, marble, sand-lime brick, sandstone, granite, porphyry, concrete and cellular concrete, and organic substances such as wood, paper, board, textiles and manmade and natural fibers. In the inventive process, the dispersions generally penetrate into the capillaries of the substrate and dry there. Mineral substrates and wood-base materials are preferably used.

The treatment method of the invention preferably comprises impregnation, coating, priming and injection, more preferably impregnation, in particular the substrate being brought into contact with the dispersion and the dispersion penetrating partly or completely into the substrate. The impregnation preferably comprises hydrophobing impregnation and can be effected both as impregnation of the surface and by injection, or as mass hydrophobing.

The water absorption of the substrate is drastically reduced by the hydrophobing according to the invention, which reduces the thermal conductivity but also prevents the destruction of the building materials by the influence of freezing and thawing cycles or by salt or, in the case of wood-based materials, by rotting or fungal attack. Thus, not only is the value of the material thus treated preserved but, for example, lower energy consumption for heating and air conditioning is also ensured.

For impregnation applications the dispersions are added to the surface of the substrate by customary distribution methods such as by brushing, spraying, knife coating, rolling, pouring, spreading with a trowel, immersion and roll coating. For masonry treatment, it is necessary for the preparations to penetrate far into the masonry. Low-viscosity dispersions are therefore preferred for the masonry treatment. The property of penetrating into the masonry may be a material property or the penetration may be artificially promoted by transporting the dispersions into the masonry at elevated pressure.

The dispersions can also be used in combinations with organic dispersions and pigments for formulating coating materials, in order to impart hydrophobic properties to these coating materials. This application can also be effected in combination with fluoroorganic polymer dispersions, for example if an oil- and dirt-repellent effect is also desired in addition to water-repellent effect, for example to prevent damage to the structure by graffiti.

In the process according to the invention, the dispersion can be applied in concentrated form or in a form diluted with water, depending on substrate and the intended effect. If the application is effected in dilute form, the content of component (A) in the dispersion is preferably from 2 to 35% by weight, in particular from 5 to 20% by weight. The process for treatment of substrates has the advantage that it is efficient and economical and that the substrates are protected in the long term from the influence of water.

In the following examples, all data relating to parts and percentages are based on weight, unless stated otherwise. Unless stated otherwise, the following examples are carried out at a pressure of the ambient atmosphere, i.e. at about 1000 hPa, and at room temperature, i.e. about 20° C., or a temperature which is established on combining the reactants at room temperature without additional heating or cooling.

EXAMPLE 1

45 parts of isooctyltriethoxysilane (available under the name SILRES® BS 1701 from Wacker Chemie AG, Munich, Germany) are mixed with 1 part of ethoxylated sorbitan laurate (HLB=16.7) and 1 part of sorbitan laurate (HLB=8.6) using an Ultra-Turrax® (IKA®-Werke GmbH & Co. KG, Staufen, Germany). Thereafter, 52.3 parts of demineralized water (conductivity <5 µS/cm) are slowly added; a milky oil-in-water emulsion is obtained. 0.5 part of hexadecyltrimethylammonium chloride (available under the name Genamin® CTAC 50 from Clariant GmbH, Frankfurt, Germany) and 0.2 part of the preservative Acticide® BX(N) (available from Thor Chemie GmbH, Speyer, Germany) are also added to this emulsion. The emulsion thus obtained is homogenized using a high-pressure homogenizer (APV 2000, Invensys APV Unna) at 500 bar. A low-viscosity emulsion which has a volume-average particle size of 1.11 µm is obtained.

In order to test the quality and stability, the following tests were carried out on the emulsion: particle size measurement (D[4,3]=volume-mean particle size) using a Malvern Mastersizer (Malvern Instruments GmbH, Herrenberg, Germany; measuring principle: Frauenhofer diffraction).

Stability on centrifuging (1 h at 4000 revolutions per min, which corresponds to a load with 2500 times the force of gravity): visual assessment of water or oil deposits and of the creaming of the emulsion.

Stability on storage at elevated temperature in a closed vessel for 14 d at 50° C.: visual assessment of water and oil deposits and of the creaming of the emulsion and determination of the molar fraction of alkyltrialkoxysilane, based on the sum of the silicon in the silanes and siloxanes in comparison with the fraction before the storage at elevated temperature, by quantitative $^{29}$Si-NMR analysis.

The results are shown in Table 1.

EXAMPLE 2

The procedure described in Example 1 is repeated, except that 0.75 part of an ethoxylated isotridecyl alcohol having 5 ethylene glycol groups (HLB=11.2), 0.75 part of an ethoxylated castor oil having 200 ethylene glycol groups (HLB=18.1) and 0.5 part of 1-methyl-2-norstearyl-3-stearic acid amidoethylimidazolinium methosulfate/propylene glycol 3:1 (available under the name Rewoquat® W 75 PG from Tego Service GmbH, Essen, Germany) are used as emulsifiers.

The results are shown in Table 1.

COMPARATIVE EXAMPLE 1

The procedure described in Example 1 is repeated, except that no hexadecyltrimethylammonium chloride is used.

The results are shown in Table 1.

COMPARATIVE EXAMPLE 2

The procedure described in Example 1 is repeated, except that, instead of the nonionic emulsifers, exclusively 2 parts of hexadecyltrimethylammonium chloride are used as an emulsifier.

The results are shown in Table 1.

COMPARATIVE EXAMPLE 3

The procedure described in Example 1 is repeated, except that, instead of the nonionic emulsifiers, 2 parts of 1-methyl-2-norstearyl-3-stearic acid amidoethylimidazolinium methosulfate/propylene glycol 3:1 are used as an emulsifier.

The results are shown in Table 1.

COMPARATIVE EXAMPLE 4

The procedure described in Example 1 is repeated, except that 2 parts of oleic acid and 0.5 part of monoethanolamine are used as an emulsifier.

The results are shown in Table 1.

COMPARATIVE EXAMPLE 5

The procedure described in Example 1 is repeated, except that 1 part of hexadecyltrimethylammonium chloride and 1 part of sorbitan laurate (HLB=8.6) are used as an emulsifier.

The results are shown in Table 1.

EXAMPLE 3

15 parts of the isooctyltriethoxysilane used in example 1 and 10 parts of octadecylmethyldimethoxysilane are mixed with 5 parts of an oligomeric alkoxysiloxane of the empirical formula $CH_3Si(OCH_2CH_3)_{0.8}O_{1.1}$ and with 7 parts of a methylsilicone resin having a glass transition temperature of 45° C., an average molar mass of about 10,000 g/mol and a content of ethoxy groups of 2.8% by weight (available under the name SILRES® BS 1321 from Wacker Chemie AG, Munich, Germany), 0.25 part of aminoethyltriethoxysilane and 2 parts of a hydrophobized silicic acid (available under the name HDK® H 2000 from Wacker Chemie AG, Munich, Germany). The mixture thus obtained is processed with 1.2 parts of an ethoxylated isotridecyl alcohol having 16 ethylene glycol groups (HLB=15.5), 0.5 part of 1-methyl-2-norstearyl-3-stearic acid amidoethylimidazolinium methosulfate and 55 parts of water using an Ultra-Turrax to give an emulsion. 4 parts of a 50% strength aqueous emulsion of a polydimethylsiloxane containing amino groups and having a viscosity of 500 mPa·s and an amine number of 0.15 meq/g (available under the name SILRES® BS 1306 from Wacker Chemie AG, Munich, Germany) are also added to this emulsion. The emulsion is homogenized using a high pressure homogenizer (APV 2000, Invensys APV Unna) at 200 bar.

The results are shown in Table 1.

EXAMPLE 4

25 parts of the isooctyltriethoxysilane used in Example 1 are mixed with 5 parts of an oligomeric alkoxysiloxane of the empirical formula $CH_3Si(OCH_2CH_3)_{0.8}O_{1.1}$ and with 7 parts of methylsilicone resin, which consists of 90 mol % of units of the formula (II), in which c is 1, and 10% of units of the formula (II), in which c is 2, having a weight average molar mass of 6700 g/mol and a content of ethoxy groups of 3.1% by weight and of hydroxy groups of 0.57% by weight, 0.25 part of aminoethylaminopropyltriethoxysilane and 2 parts of a hydrophobized silicic acid (available under the name HDK® H 2000 from Wacker Chemie AG, Munich, Germany). The mixture thus obtained is processed with 0.6 part of an ethoxylated isotridecyl alcohol having 5 ethylene glycol groups (HLB=11.2), 0.6 part of an ethoxylated castor oil having 200 ethylene glycol groups (HLB=18.1), 0.5 part of benzyltrimethylammonium chloride and 55 parts of water using an Ultra-Turrax to give an emulsion. 4 parts of a 50% strength aqueous emulsion of a polydimethylsiloxane containing amino groups and having a viscosity of 500 mPa·s and an amine number of 0.15 meq/g (available under the name SILRES® BS 1306 from Wacker Chemie AG, Munich, Germany) are also added to this emulsion. The emulsion is homogenized using a high-pressure homogenizer (APV 2000, Invensys APV Unna) at 200 bar.

The results are shown in Table 1.

TABLE 1

| Example | D[4,3] in μm | Deposits in centrifuging | Deposits after storage at elevated temperature | Alkyltrialkoxysilane After Storage At Elevated Temperature |
|---|---|---|---|---|
| 1 | 1.11 | 12% | 10% | 100% |
| 2 | 0.71 | 23% | 6% | 100% |
| 3 | 0.75 | 3% | 1% | 100% |
| 4 | 0.87 | 4% | 2% | 100% |
| C1 | 0.79 | 16% | separate | not determined |
| C2 | 0.56 | 50% | 18% | not determined |
| C3 | | | no emulsion formation | |
| C4 | 0.40 | 6% | satisfactory | 10% |
| C5 | 0.59 | 40% | not determined | not determined |

EXAMPLE 5

The dispersions according to the invention are used for impregnating mortar disks. For the production of the mortar disks, 2700 g of standard sand (available from Normensand GmbH, 59269 Beckum near Münster, Germany), 900 g of white cement PZ 450 Z (available from Dyckerhoff Zementwerke AG, D-65203 Wiesbaden, Germany) and 450 g of tapwater were mixed. The mixture is then poured into plastic rings (diameter 8.5 cm, height 2 cm), which are present on a plastic film. For compaction and removal of air inclusions, a spatula is inserted frequently into the material and the supernatant of the concrete mix is then removed using the spatula. The samples are covered with a film and cleaned at the edges. The test specimens must be stored for at least 3 months under standard climatic conditions (23° C., 50% relative humidity) before being used. Immediately before use, the top of the samples is sandblasted for removing the sintered cement layer.

Prior to impregnation, the mortar disks thus obtained are immersed for 2 minutes in demineralized water and, after packing in film, are stored for 12 hours at room temperature. Thereafter, they are stored without packing for 2 hours under standard climatic conditions (23/50) and are impregnated after determining the initial weight (W1). This is done by a procedure in which the test specimens are immersed for 1 minute in the respective dispersion according to the invention (excess liquid level about 5 cm). The dispersions according to examples 1 and 2 are used in concentrated form and the dispersions according to examples 3 and 4 diluted in weight ratio 1:4 with water for the impregnation. Weighing (W2) is now effected again, and the absorption of impregnating agent is determined from the difference (W2−W1).

For development of the hydrophobic effect, the samples are stored for 14 days under standard climatic conditions (23/50). The test specimens are now weighed again (W5) and placed for 24 hours in demineralized water (excess water level 5 cm). The water absorption is determined by weighings (W6). The percentage water absorption is calculated according to (W6−W5)/W5×100. The results and a blind test without dispersion (mean values of 3 mortar disks in each case) are shown in the following table:

TABLE 2

| Example | Water Absorption in % | Penetration Depth in mm |
|---|---|---|
| 1 | 0.35 | 6 |
| 2 | 0.36 | 5 |
| 3 | 0.72 | 2 |
| 4 | 1.14 | 1 |
| untreated | 6.84 | — |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An aqueous dispersion comprising:
   (A) at least one organosilicon compound (A1) or a mixture of at least one of (A1) and one of (A2) where silane (A1) is of the formula $$R_aR^2_bSi(OR^1)_{4-a-b} \quad (I),$$

in which
   R are identical or different and are monovalent, SiC-bonded, optionally substituted hydrocarbon radicals having at least 4 carbon atoms,
   $R^1$ are identical or different and are monovalent, optionally substituted hydrocarbon radicals,
   $R^2$ are identical or different and are monovalent, SiC-bonded, optionally substituted hydrocarbon radicals having 1 to 3 carbon atoms,
   a is 1, 2 or 3 and
   b is 0, 1 or 2, with the proviso that the sum of a and b is 1, 2 or 3,
   and/or the partial hydrolysis products thereof, and siloxane(s) (A2) comprise units of the formula $$R^3_c(R^4O)_dSiO_{(4-c-d)/2} \quad (II),$$

in which
   $R^3$ are identical or different and are hydrogen or a monovalent, SiC-bonded, optionally substituted hydrocarbon radical,
   $R^4$ are identical or different and are hydrogen or a monovalent, optionally substituted hydrocarbon radical,
   c is 0, 1, 2 or 3 and
   d is 0, 1, 2 or 3, with the proviso that the sum of c and d is less than or equal to 3,
   (B) at least one nonionic emulsifier having an HLB value greater than or equal to 14, and with one or more nonionic emulsifiers having an HLB value of less than 12,
   (C) at least one cationic surfactant selected from the group consisting of
   (C 1) compound(s) of the formula $$(CH_3)_3R^6_{(4-e)}N^+X^- \quad (III), \text{ and}$$

(C2) compound(s) of the formula

(IV)

in which
   $R^5$ are optionally substituted hydrocarbon radicals,
   $R^6$ are identical or different and are optionally substituted aliphatic hydrocarbon radicals having at least 10 carbon atoms or optionally substituted aromatic hydrocarbon radicals having at least 6 carbon atoms,
   $R^7$ are optionally substituted aliphatic hydrocarbon radicals having at least 10 carbon atoms or optionally substituted aromatic hydrocarbon radicals having at least 6 carbon atoms,
   $R^8$ are optionally substituted hydrocarbon radicals, and
   $X^-$ is a monovalent organic or inorganic anion, and
   (D) water.

2. The aqueous dispersion of claim 1, wherein component (A) comprises a mixture of (A1) and (A2).

3. The aqueous dispersion of claim 1, wherein a mixture of nonionic emulsifiers, of which at least one emulsifier has an HLB value greater than or equal to 14, is used as component (B).

4. The aqueous dispersion of claim 1, wherein component (C) is a benzyltrimethylammonium compound or a quaternary imidazolinium compound.

5. The aqueous dispersion of claim 1, which is an aqueous dispersion comprising:
   (A) from 10 to 60% by weight of (A1) and from 0 to 20% by weight of (A2), (B) from 1.0 to 10% by weight of mixtures of nonionic emulsifiers, of which at least one emulsifier has an HLB value greater than or equal to 14, (C) from 0.1 to 5% by weight of cationic surfactant of the formulae (III) and/or (IV), and (D) water.

6. The aqueous dispersion of claim 1, wherein siloxane (A2) is not present.

7. The aqueous dispersion of claim 1, wherein (A1) comprises isooctyltriethoxysilane, octadecylmethyltriethoxysilane, or a mixture thereof.

8. The aqueous dispersion of claim 1, which is free of water-immiscible organic solvents.

* * * * *